March 12, 1940.   G. ULRICH   2,193,149
WHEEL BAND
Filed July 15, 1939   2 Sheets-Sheet 1

Guy Ulrich
INVENTOR.

BY Snow Geo.
ATTORNEYS.

March 12, 1940.         G. ULRICH         2,193,149
WHEEL BAND
Filed July 15, 1939      2 Sheets-Sheet 2
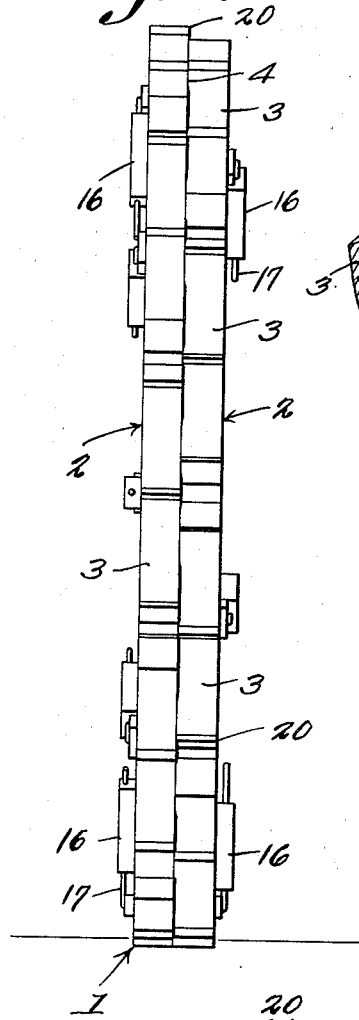
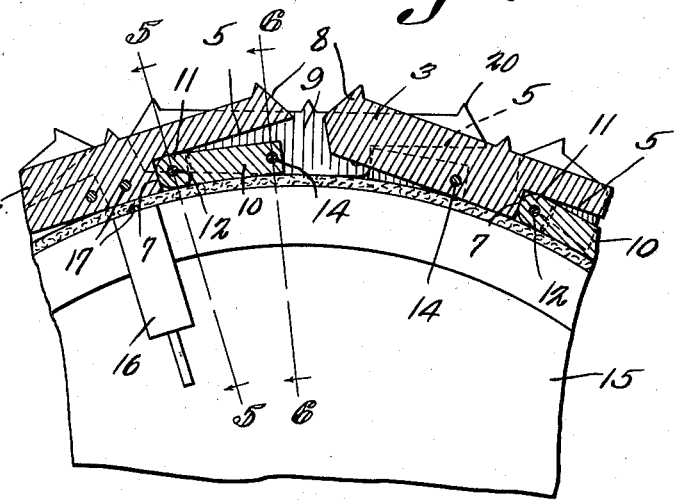
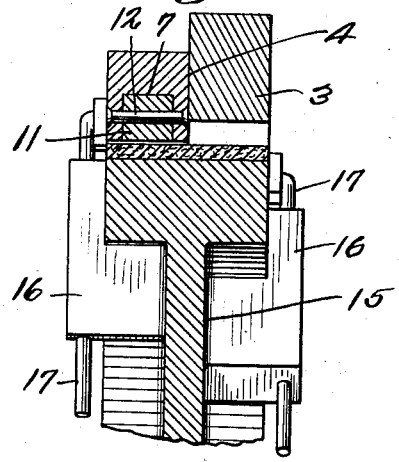
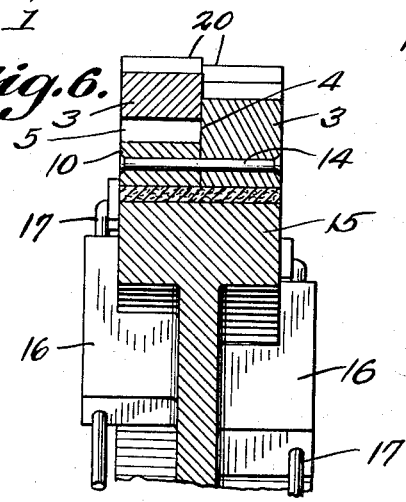
Guy Ulrich
INVENTOR.
BY *CASnowles*
ATTORNEYS.

Patented Mar. 12, 1940

2,193,149

UNITED STATES PATENT OFFICE 2,193,149

WHEEL BAND

Guy Ulrich, Buhl, Idaho

Application July 15, 1939, Serial No. 284,803

3 Claims. (Cl. 305—10)

This invention aims to provide a wheel band, intended for two purposes. In some sections of the country, irrigation is brought about by corrugations in the soil, producing small ditches, varying in width from five to seven inches, and varying from twenty-four to thirty inches apart. The invention aims to provide a wheel band which will carry agricultural machinery across the aforesaid corrugations smoothly, and bridge them adequately. The invention aims, moreover, to provide a wheel band which will afford traction in sand or mud.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 3 is an elevation wherein the device is viewed edgewise;

Fig. 4 is a fragmental circumferential section;

Fig. 5 is a transverse section on the line 5—5 of Fig. 4;

Fig. 6 is a transverse section on the line 6—6 of Fig. 4.

Figure 1:
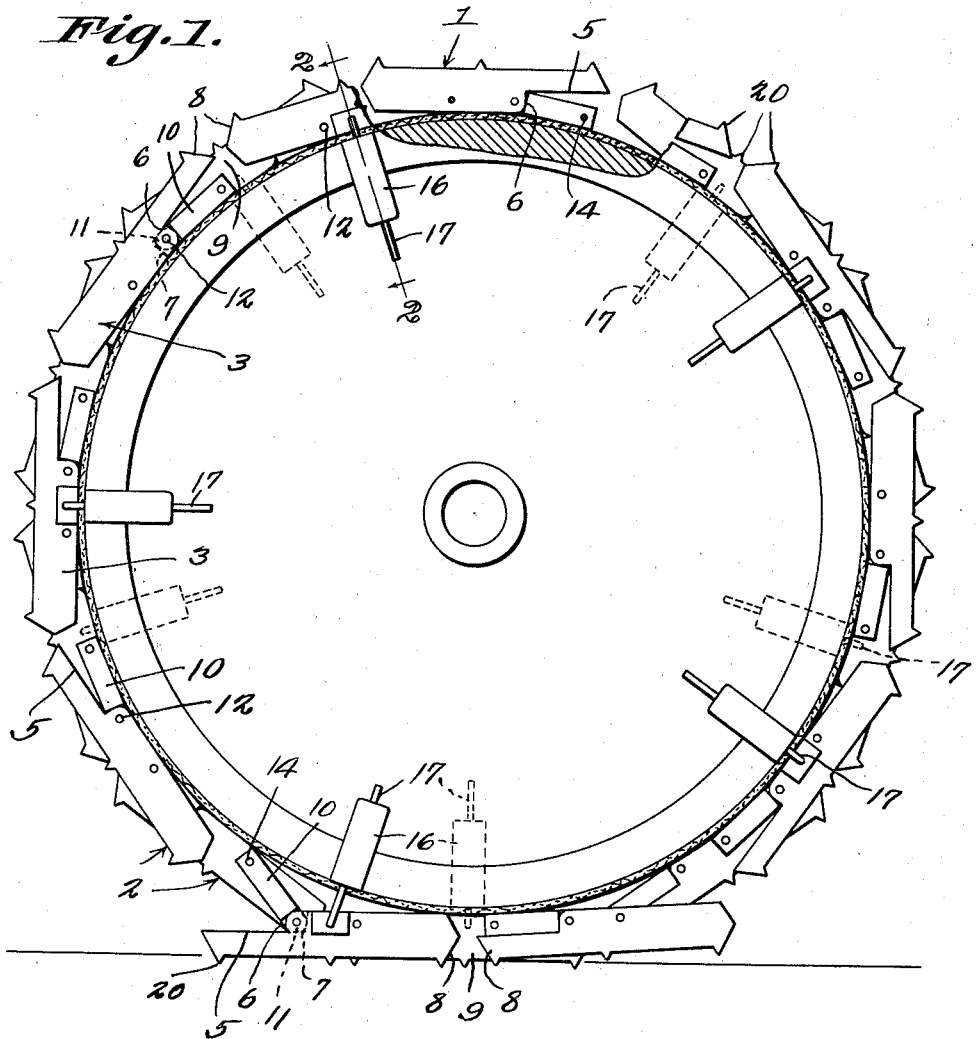
Fig. 1 shows in side elevation, a device constructed in accordance with the invention.
Figure 2:
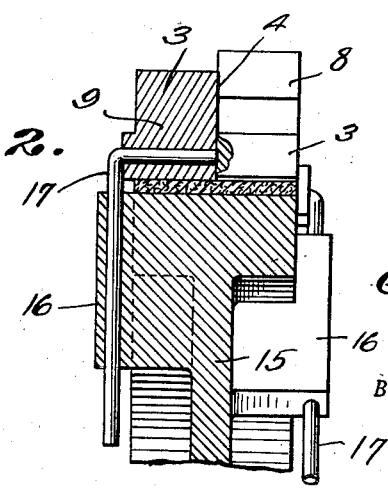
Fig. 2 is a section on the line 2—2 of Fig. 1.

The device forming the subject matter of this application may be made of any desired material, such as metal. It comprises a wheel band 1, made up of rings 2 of elongated tread members 3, the rings being located side by side, in vertically slidable contact, as indicated at 4.

The tread members 3 of each ring 2 are equipped at one end with an underlying recess 5 defining a shoulder 6, the shoulder 6 being supplied with a circumferentially extended opening 7.

The recesses 4 of both rings 2 open in the same direction, circumferentially of the band 1, through the ends of the tread members, as Fig. 4 will make manifest.

The adjoining ends 8 of the tread members 3 of each ring 2 are disposed opposite to the intermediate portion 9 of a tread member of the other ring 2, as can be seen in Fig. 4 of the drawings.

A link 10 is located in the recess 5 of each tread member 3 of each ring 2, at the side of the tread member of the other ring.

Each tread member 3 is provided at one end with a reduced tongue 11, received in the opening 7 in the shoulder 6 of the next adjoining tread member 3 of the same ring and is mounted on a pivot element 12. By means of a pivot element 14, the opposite end of each tread member 3 of each ring is connected to the side of the intermediate portion of a tread member of the other ring.

The device is mounted circumferentially on the rim of a wheel 15. There are lugs 16 on opposite sides of the wheel 15, at the rim thereof. Rectangular keepers 17 are provided. The horizontal portions of the keepers are mounted in the tread members 3, at a place midway between the ends thereof. The radial parts of the keepers 17 have longitudinal sliding movement in the lugs 16. There may be as many or as few of the lugs 16 and the keepers 17 as is desired. The tread members 3 may be supplied with traction cleats 20 of any preferred form.

As shown in Fig. 1 of the drawings, as the wheel 15 rolls along, the tread members 3 will be presented to the soil, and the bridging and traction effects hereinbefore alluded to will be consummated.

Having thus described the invention, what is claimed is:

1. A wheel band comprising a pair of rings of elongated tread members, the rings of the pair being located side by side, the tread members of each ring of the pair being equipped at one end with an underlying recess defining a shoulder, the shoulder being supplied with a circumferentially extended opening, the recesses of the tread members of both rings of the pair opening in one direction, circumferentially of the band, the adjoining ends of the tread members of each ring of the pair being disposed opposite to the intermediate portion of a tread member of the other ring of the pair, links located in the recesses of the tread members of both rings of the pair, at the side of a tread member of the other ring of the pair, the links being provided at one end with reduced tongues received in the openings in the shoulders of the next adjoining tread members of the same ring of the pair and pivotally held therein, and means for pivotally connecting the opposite end of the links of each ring of the pair to the side of the intermediate portion of a tread member of the other ring of the pair.

2. A wheel band comprising a pair of rings of elongated tread members, the rings of the pair being located side by side, the tread members of each ring of the pair being equipped at one end with an underlying recess defining a shoulder, the recesses of the tread members of both rings of the pair opening in one direction, circumferentially of the band, the adjoining ends of the tread members of each ring of the pair being disposed opposite to the intermediate portion of a tread member of the other ring of the pair, links located in the recesses of the tread members of both rings of the pair, at the side of a tread member of the other ring of the pair, the links being pivoted at one end to the tread member of each ring of the pair, adjacent the shoulder thereof and means for pivotally connecting the opposite end of the links of each ring of the pair to the side of the intermediate portion of the tread member of the other ring of the pair.

3. A wheel band constructed as set forth in claim 2, in combination with keepers pivotally mounted in certain of the tread members, intermediate their ends, and a wheel about which the band is disposed, the wheel having means for receiving the keepers for sliding movement, radially of the wheel.

GUY ULRICH.